J. S. ROBERTS.
SHOCK ABSORBER FOR AUTOMOBILE SPRINGS.
APPLICATION FILED JULY 17, 1915.

1,194,069.

Patented Aug. 8, 1916.

Witnesses

Inventor
J. S. Roberts
By
Attorney

UNITED STATES PATENT OFFICE.

JOHN S. ROBERTS, OF OSGOOD, IOWA, ASSIGNOR OF ONE-HALF TO S. W. BREFFLE, OF OSGOOD, IOWA.

SHOCK-ABSORBER FOR AUTOMOBILE-SPRINGS.

1,194,069.

Specification of Letters Patent.

Patented Aug. 8, 1916.

Application filed July 17, 1915. Serial No. 40,470.

*To all whom it may concern:*

Be it known that I, JOHN S. ROBERTS, a citizen of the United States, residing at Osgood, in the county of Palo Alto and State of Iowa, have invented certain new and useful Improvements in Shock-Absorbers for Automobile-Springs; and I do hereby declare the following to be a full, clear, and exact description of the invention, such as will enable others skilled in the art to which it appertains to make and use the same.

The invention relates to improvements in shock absorbers for automobile springs.

The object of the present invention is to improve the construction of shock absorbers for automobile springs and to provide a simple, practical and comparatively inexpensive device of strong and durable construction, adapted to be readily applied to various automobile springs and capable of preventing the same from going down too far and of stopping too suddenly thereby relieving an automobile spring from the effects of a crushing force and greatly increasing the life of the springs.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

Figure 1:
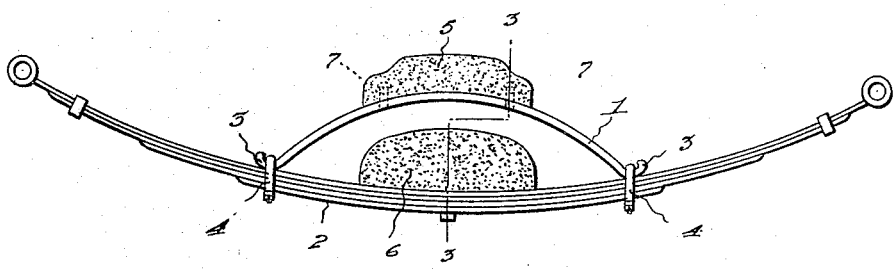
Figure 2:
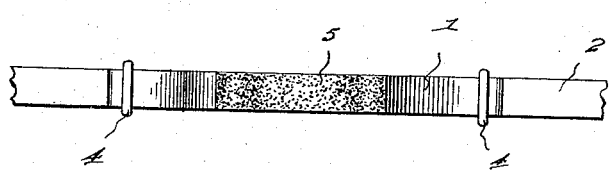
Figure 3:
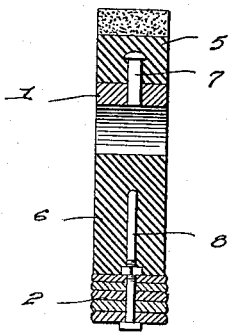

In the drawing Figure 1 is a side elevation of a shock absorber constructed in accordance with this invention and shown applied to an automobile spring, Fig. 2 is a plan view of the same, Fig. 3 is a transverse sectional view on the line 3—3 of Fig. 1.

Like numerals of reference designate corresponding parts in the several figures of the drawings.

In the accompanying drawing in which is illustrated the preferred embodiment of the invention, the shock absorber comprises in its construction an auxiliary frame 1 constructed of steel and of a strength corresponding to the character of automobile or other motor vehicle on which it is to be employed and bowed upwardly in the opposite direction from an automobile spring 2.

The automobile springs 2 may be of any desired construction and although a semi-elliptic automobile spring is illustrated in the accompanying drawing the shock absorber may of course be used on a three-quarter automobile spring or a full elliptic spring if desired. The upwardly bowed auxiliary spring which arches the central portion of the automobile spring has its terminals seated upon the automobile spring at opposite sides of the center thereof and provided with lugs or enlargements 3 for retaining clips 4 on the ends of the auxiliary shock absorbing spring 1. The lugs are located at the outer sides of the clips and while they permit a ready expansion and contraction of the springs they are retained on the terminals of the auxiliary or shock absorbing springs and are prevented from becoming displaced from the same.

The shock absorbing spring is preferably used in conjunction with upper and lower cushions 5 and 6 which are secured to the shock absorbing spring and the automobile spring by suitable fastening devices 7 and 8. The upper and lower cushions are constructed of rubber or other suitable material and fastening devices of any desired construction may of course be employed. The upper cushion is arranged upon the central portion of the shock absorbing spring 1 and the lower cushion is mounted upon the central portion of the automobile spring and is interposed between the same and the shock absorbing spring.

The shock absorbing device is adapted to prevent the automobile spring from going down too far and also from stopping too suddenly and it will relieve the automobile spring of the effect of a crushing strain or weight and greatly increase the life or durability of the automobile spring. Either or both of the cushions may be omitted when desired.

While the shock absorbing device is designed primarily for use on automobile springs and other motor vehicle springs it may be advantageously employed on similar springs of any vehicle.

What is claimed is:—

The combination with a semi-elliptic vehicle spring, a centrally arranged cushion mounted upon the central portion of the vehicle spring, an auxiliary shock absorbing spring reversely curved with respect to the vehicle spring and arching the central portion thereof and located above and spaced from the said cushion and means for securing the ends of the auxiliary shock absorbing spring to the vehicle spring at opposite sides of the said cushion, the latter being adapted to limit the downward movement of the auxiliary spring which also limits the downward movement of the vehicle spring.

In testimony whereof I affix my signature in presence of two witnesses.

JOHN S. ROBERTS.

Witnesses:
C. H. GIDDINGS,
BELLE GIDDINGS.

Copies of this patent may be obtained for five cents each, by addressing the "Commissioner of Patents, Washington, D. C."